(12) United States Patent
Venkatraman et al.

(10) Patent No.: US 9,113,291 B2
(45) Date of Patent: Aug. 18, 2015

(54) LOCATION DETECTION WITHIN IDENTIFIABLE PRE-DEFINED GEOGRAPHIC AREAS

(71) Applicant: QUALCOMM Incorporated, San Diego, CA (US)

(72) Inventors: Sai Pradeep Venkatraman, Santa Clara, CA (US); Lionel Jacques Garin, Palo Alto, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 13/787,387

(22) Filed: Mar. 6, 2013

(65) Prior Publication Data
US 2013/0336138 A1  Dec. 19, 2013

Related U.S. Application Data

(60) Provisional application No. 61/661,162, filed on Jun. 18, 2012.

(51) Int. Cl.
*H04W 4/02* (2009.01)
*G01S 19/48* (2010.01)
*G01S 5/02* (2010.01)

(52) U.S. Cl.
CPC ............... *H04W 4/02* (2013.01); *G01S 5/0257* (2013.01); *G01S 5/0278* (2013.01); *G01S 19/48* (2013.01)

(58) Field of Classification Search
CPC ... H04L 9/0872; H04L 12/5865; H04W 4/02; H04W 4/023–4/025; H04W 4/04; H04W 40/12; H04W 40/20; G01S 5/30; G01S 5/0063; G01S 5/0027; G01S 19/01; G01S 19/07; G01S 19/0127; G01S 19/03; G01S 19/31–19/33; G01S 19/39; G01S 19/48; G01S 5/0257; G01S 5/0278
USPC .................... 370/310, 316, 324, 350, 395.62, 370/328–329, 331–334, 338–339, 341; 455/67.3, 443–444, 446, 448–450, 455/456, 464, 502, 524–525
See application file for complete search history.

(56) References Cited

U.S. PATENT DOCUMENTS 7,898,977 B2 * 3/2011 Roese et al. .................. 370/254
7,911,988 B2   3/2011 Riley et al.
(Continued)

FOREIGN PATENT DOCUMENTS

EP     2215869 B1     6/2012
WO  2010073057 A1   7/2010

OTHER PUBLICATIONS

International Preliminary Report on Patentability—PCT/US2013/043513—The International Bureau of WIPO Geneva, Switzerland, May 19, 2014, 7 pages.
(Continued)

*Primary Examiner* — Charles C Jiang
*Assistant Examiner* — Mohamed Kamara
(74) *Attorney, Agent, or Firm* — Hunter Clark PLLC

(57) ABSTRACT

Disclosed are systems, apparatus, devices, methods, computer program products, and other implementations, including a method that includes receiving signals at a mobile device from one or more access points, computing one or more positioning quality parameters by analyzing the received signals, and determining based, at least in part, on the computed one or more positioning quality parameters whether the mobile device is inside at least one of one or more areas respectively associated with the one or more access points.

44 Claims, 6 Drawing Sheets

(56) References Cited

U.S. PATENT DOCUMENTS

| | | | |
|---|---|---|---|
| 2003/0054813 A1* | 3/2003 | Riley et al. | 455/424 |
| 2004/0203904 A1* | 10/2004 | Gwon et al. | 455/456.1 |
| 2007/0049295 A1 | 3/2007 | Soliman et al. | |
| 2009/0002188 A1 | 1/2009 | Greenberg | |
| 2009/0059879 A1* | 3/2009 | Yamaoka et al. | 370/338 |
| 2009/0077620 A1* | 3/2009 | Ravi et al. | 726/1 |
| 2009/0168674 A1* | 7/2009 | Strutt et al. | 370/310 |
| 2009/0322605 A1* | 12/2009 | Farmer et al. | 342/357.12 |
| 2010/0007552 A1 | 1/2010 | Oda et al. | |
| 2010/0063854 A1 | 3/2010 | Purvis et al. | |
| 2010/0178934 A1* | 7/2010 | Moeglein et al. | 455/456.1 |
| 2010/0291907 A1 | 11/2010 | MacNaughtan et al. | |
| 2011/0081919 A1* | 4/2011 | Das et al. | 455/456.1 |
| 2011/0294515 A1 | 12/2011 | Chen et al. | |

OTHER PUBLICATIONS

International Search Report and Written Opinion—PCT/US2013/043513—ISA/EPO—Aug. 16, 2013.

\* cited by examiner

LOCATION DETECTION WITHIN IDENTIFIABLE PRE-DEFINED GEOGRAPHIC AREAS

CLAIM OF PRIORITY UNDER 35 U.S.C. §119

The present application claims priority to U.S. Provisional Application Ser. No. 61/661,162, entitled "SYSTEM AND METHOD FOR IN- AND OUT-OF-LCI DETECTION," and filed Jun. 18, 2012, which is assigned to the assignee hereof, and expressly incorporated herein by reference.

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Various applications are utilized to locate the position of a wireless communication device. For instance, location based services (LBSs) leverage the location of an associated device to provide controls for one or more applications running on the device. Applications of LBS functionality implemented with respect to wireless communication devices include personal navigation, social networking, targeting of content (e.g., advertisements, search results, etc.), among others.

SUMMARY

In some variations, a mobile device-implemented method is disclosed. The method includes receiving signals at a mobile device from one or more access points, computing one or more positioning quality parameters by analyzing the received signals, and determining based, at least in part, on the computed one or more positioning quality parameters whether the mobile device is inside at least one of one or more areas respectively associated with the one or more access points.

Embodiments of the method may include at least some of the features described in the present disclosure, including one or more of the following features.

The one or more access points may be associated with one or more location context identifiers (LCIs). Determining based, at least in part, on the computed one or more positioning quality parameters whether the mobile device is inside the at least one of the one or more areas respectively associated with the one or more access points may include determining based, at least in part, on the computed one or more positioning quality parameters whether the mobile device is inside the at least one of the one or more areas respectively associated with the one or more LCIs.

Computing the one or more positioning quality parameters may include computing a horizontal estimated position error (HEPE) associated with the received signals.

Computing the one or more positioning quality parameters may include computing a variance between actual round trip times (RTTs) or ranges associated with the received signals and expected RTTs or ranges associated with the received signals.

The method may further include switching an operating mode of a positioning engine between a single-fix mode and a tracking mode based on determination of whether the mobile device is inside the at least one of the one or more areas that are respectively associated with the one or more access points.

Switching the operating mode of the positioning engine may include operating the positioning engine in the single-fix mode when the mobile device is determined to be outside the at least one of the one or more areas respectively associated with the one or more access points.

Operating the positioning engine in the single-fix mode may include determining a likely location of the mobile device based on a subset of available feasible nodes used to determine the likely location of the mobile device.

Switching the operating mode of the positioning engine may include disabling transitions between the single-fix mode and the tracking mode based on one or more values for at least one historical positioning quality parameter for one or more previous fixes.

The method may further include displaying a position fix, determined based on the received signals from the one or more access points, at the mobile device. Computing the one or more positioning quality parameters may include computing a horizontal estimated position error (HEPE) associated with the received signals, and the method may further include suspending display of the position fix when position of the mobile device is determined to be outside the at least one of the one or more areas respectively associated with the one or more access points and the computed HEPE is above a HEPE-Display threshold.

Determining based, at least in part, on the computed one or more positioning quality parameters whether the mobile device is inside the at least one of the one or more areas respectively associated with the one or more access points may include defining a first bounding area using boundaries of the one or more areas respectively associated with the one or more access points, defining a second bounding area that extends from the first bounding area by a predetermined distance, determining whether the mobile device is positioned within the first bounding area, and when the mobile device is positioned outside the first bounding area, determining whether the mobile device is positioned within the second bounding area.

Computing the one or more positioning quality parameters may include computing at least one received signal strength indication (RSSI) for at least one of the received signals, and determining based, at least in part, on the computed one or more positioning quality parameters whether the mobile device is inside the at least one of one or more areas respectively associated with the one or more access points may include comparing the computed at least one RSSI to a predetermined RSSI threshold.

The method may further include displaying on the mobile device a first map of a first area in response to a determination that the mobile device is inside the first area, and displaying a second map of a second area on the mobile device in response to a determination that the mobile device moved outside the first area and inside the second area.

In some variations, an apparatus is disclosed. The apparatus includes at least one processor, and a memory, coupled to the at least one processor. The memory includes software code for implementing a positioning receiver coupled to a mobile device and configured to receive signals from one or more access points, a signal analysis module configured to compute one or more positioning quality parameters by analyzing the received signals, and a detector configured to determine based, at least in part, on the computed one or more positioning quality parameters whether the mobile device is inside at least one of one or more areas respectively associated with the one or more access points.

Embodiments of the apparatus may include at least some of the features described in the present disclosure, including at least some of the features described above in relation to the method, as well as one or more of the following features.

The one or more access points may be associated with one or more location context identifiers (LCIs), and the detector configured to determine based, at least in part, on the computed one or more positioning quality parameters whether the mobile device is inside the at least one of the one or more areas respectively associated with the one or more access points may be configured to determine based, at least in part, on the computed one or more positioning quality parameters whether the mobile device is inside the at least one of the one or more areas respectively associated with the one or more LCIs.

The signal analysis module configured to compute the one or more positioning quality parameters may be configured to compute a horizontal estimated position error (HEPE) associated with the received signals.

The signal analysis module configured to compute the one or more positioning quality parameters may be configured to compute a variance between actual round trip times (RTTs) or ranges associated with the received signals and expected RTTs or ranges associated with the received signals.

The apparatus may further include a controller to switch an operating mode of a positioning engine between a single-fix mode and a tracking mode based on determination of whether the mobile device is inside the at least one of the one or more areas that are respectively associated with the one or more access points.

The controller to switch the operating mode of the positioning engine may be configured to operate the positioning engine in the single-fix mode when the mobile device is determined to be outside the at least one of the one or more areas respectively associated with the one or more access points.

The controller configured to operate the positioning engine in the single-fix mode may be configured to determine a likely location of the mobile device based on a subset of available feasible nodes used to determine the likely location of the mobile device.

The controller configured to switch the operating mode of the positioning engine may be configured to disable transitions between the single-fix mode and the tracking mode based on one or more values for at least one historical positioning quality parameter for one or more previous fixes.

The apparatus may further include a display device, at the mobile device, configured to display a position fix determined based on the received signals from the one or more access points.

The signal analysis module configured to compute the one or more positioning quality parameters may be configured to compute a horizontal estimated position error (HEPE) associated with the received signals, and the display device may be further configured to suspend display of the position fix when position of the mobile device is determined to be outside the at least one of the one or more areas respectively associated with the one or more access points, and the computed HEPE is above a HEPE-Display threshold.

The detector configured to determine based, at least in part, on the computed one or more positioning quality parameters whether the mobile device is inside the at least one of the one or more areas respectively associated with the one or more access points may be configured to define a first bounding area using boundaries of the one or more areas respectively associated with the one or more access points, define a second bounding area that extends from the first bounding area by a predetermined distance, determine whether the mobile device is positioned within the first bounding area, and determine whether the mobile device is positioned within the second bounding area when the mobile device is positioned outside the first bounding area.

The signal analysis module configured to compute the one or more positioning quality parameters may be configured to compute at least one received signal strength indication (RSSI) for at least one of the received signals, and the detector configured to determine based, at least in part, on the computed one or more positioning quality parameters whether the mobile device is inside the at least one of the one or more areas respectively associated with the one or more access points may be configured to compare the computed at least one RSSI to a pre-determined RSSI threshold.

The apparatus may further include a display device configured to display on the mobile device a first map of a first area in response to a determination that the mobile device is inside the first area, and display a second map of a second area on the mobile device in response to a determination that the mobile device moved outside the first area and inside the second area.

In some variations, a system is disclosed. The system includes means for receiving signals at a mobile device from one or more access points, means for computing one or more positioning quality parameters by analyzing the received signals, and means for determining based, at least in part, on the computed one or more positioning quality parameters whether the mobile device is inside at least one of one or more areas respectively associated with the one or more access points.

Embodiments of the system may include at least some of the features described in the present disclosure, including at least some of the features described above in relation to the method and the apparatus, as well as one or more of the following features.

The one or more access points may be associated with one or more location context identifiers (LCIs), and the means for determining based, at least in part, on the computed one or more positioning quality parameters whether the mobile device is inside the at least one of the one or more areas respectively associated with the one or more access points may include means for determining based, at least in part, on the computed one or more positioning quality parameters whether the mobile device is inside the at least one of the one or more areas respectively associated with the one or more LCIs.

The means for computing the one or more positioning quality parameters may include means for computing a horizontal estimated position error (HEPE) associated with the received signals.

The means for computing the one or more positioning quality parameters may include means for computing a variance between actual round trip times (RTTs) or ranges associated with the received signals and expected RTTs or ranges associated with the received signals.

The system may further include means for switching an operating mode of a positioning engine between a single-fix mode and a tracking mode based on determination of whether the mobile device is inside the at least one of the one or more areas that are respectively associated with the one or more access points.

The means for switching the operating mode of the positioning engine may include means for operating the positioning engine in the single-fix mode when the mobile device is determined to be outside the at least one of the one or more areas respectively associated with the one or more access points.

The means for operating the positioning engine in the single-fix mode may include means for determining a likely location of the mobile device based on a subset of available feasible nodes used to determine the likely location of the mobile device.

The means for switching the operating mode of the positioning engine may include means for disabling transitions between the single-fix mode and the tracking mode based on one or more values for at least one historical positioning quality parameter for one or more previous fixes.

The system may further include means for displaying a position fix, determined based on the received signals from the one or more access points, at the mobile device.

The means for computing the one or more positioning quality parameters may include means for computing a horizontal estimated position error (HEPE) associated with the received signals, and the system may further include means for suspending display of the position fix when position of the mobile device is determined to be outside the at least one of the one or more areas respectively associated with the one or more access points and the computed HEPE is above a HEPE-Display threshold.

The means for determining based, at least in part, on the computed one or more positioning quality parameters whether the mobile device is inside the at least one of the one or more areas respectively associated with the one or more access points may include means for defining a first bounding area using boundaries of the one or more areas respectively associated with the one or more access points, means for defining a second bounding area that extends from the first bounding area by a predetermined distance, means for determining whether the mobile device is positioned within the first bounding area, and means for determining whether the mobile device is positioned within the second bounding area when the mobile device is positioned outside the first bounding area.

The means for computing the one or more positioning quality parameters may include means for computing at least one received signal strength indication (RSSI) for at least one of the received signals, and the means for determining based, at least in part, on the computed one or more positioning quality parameters whether the mobile device is inside the at least one of one or more areas respectively associated with the one or more access points may include means for comparing the computed at least one RSSI to a pre-determined RSSI threshold.

The system may further include means for displaying on the mobile device a first map of a first area in response to a determination that the mobile device is inside the first area, and means for displaying a second map of a second area on the mobile device in response to a determination that the mobile device moved outside the first area and inside the second area.

In some variations, a non-transitory processor readable media programmed with a set of instructions executable on a processor is disclosed. When executed, the set of instructions causes operations including receiving signals at a mobile device from one or more access points, computing one or more positioning quality parameters by analyzing the received signals, and determining based, at least in part, on the computed one or more positioning quality parameters whether the mobile device is inside at least one of one or more areas respectively associated with the one or more access points.

Embodiments of the processor-readable media may include at least some of the features described in the present disclosure, including at least some of the features described above in relation to the method, the apparatus, and the system.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Other and further objects, features, aspects, and advantages of the present disclosure will become better understood with the following detailed description of the accompanying drawings.

DETAILED DESCRIPTION

Described herein are systems, apparatus, methods, devices, products, and other implementations, for determining whether a mobile device is inside a particular area, associated, in some embodiments, by an access point (AP) and/or an identifier (such as a location context identifier, or LCI), and for managing a positioning system of the mobile device based on this determination. In some embodiments, a method (implemented, for example, on a mobile device) is disclosed that includes receiving signals at a mobile device from one or more access points, computing one or more positioning quality parameters by analyzing the received signals, and determining based, at least in part, on the computed one or more positioning quality parameters whether the mobile device is inside at least one of one or more areas respectively associated with the one or more access points. Examples of positioning quality parameters include a computed horizontal estimated position error (HEPE) associated with the received signals, a computed a variance between actual round trip times (RTTs) or ranges associated with the received signals and expected RTTs or ranges associated with the received signals, a computed at least one received signal strength indication (RSSI) for at least one of the received signals, etc.

Figure 1:
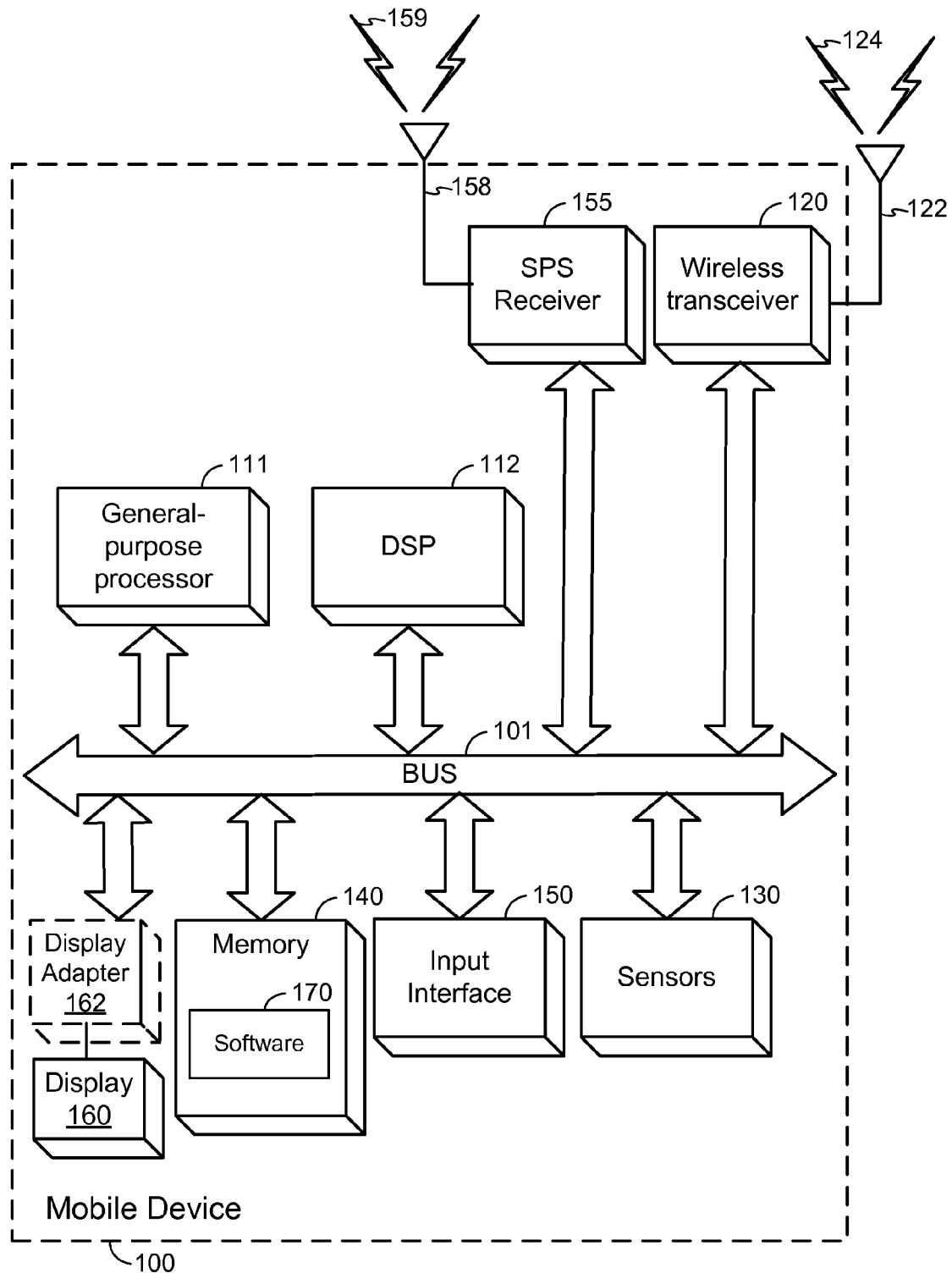
FIG. 1 is a block diagram of components of an example mobile station.

Referring to FIG. 1, a mobile device 100 is illustrated for which various techniques and procedures may be utilized. The mobile device 100 (also referred to as a mobile station) can include or implement the functionality of various mobile communication and/or computing devices, including, but are not limited to, personal digital assistants (PDAs), smartphones, computing devices such as laptops, desktops or tablet computers, automobile computing systems, etc., whether presently existing or developed in the future. As used herein, the term "mobile device" (or "mobile station") is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, "mobile device" is intended to include all devices, including wireless communication devices, computers, laptops, tablet, etc., which are capable of communication with a server, such as via the Internet, WiFi, or other network, regardless of whether satellite signal reception, assistance data reception, and/or position-related processing occurs at the device, at a server, or at another device associated with the network. Any operable combinations of the above are also considered a "mobile device."

The mobile device 100 includes a wireless transceiver 120, which is connected to a bus 101, to send and receive wireless signals 124 via a wireless antenna 122 over a wireless network. In some embodiments, the wireless transceiver 120 may be connected to the bus 101 via, for example, an interface (not shown), such as a baseband or RF interface. Here, the mobile device 100 is illustrated as having a single wireless transceiver 120. However, a mobile device 100 can alternatively have multiple wireless transceivers 120 and wireless antennas 122 to support multiple communication standards such as WiFi, CDMA, Wideband CDMA (WCDMA), Long Term Evolution (LTE), Bluetooth, etc.

The wireless transceiver 120 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, control information, data, etc.

The mobile device 100 may also include an SPS receiver 155 to receive satellite positioning system (SPS) signals 159 (e.g., from SPS satellites) via an SPS antenna 158. The SPS receiver 155 may be coupled to the bus 101 (possibly via an interface). The SPS receiver 155 can communicate with a single global navigation satellite system (GNSS) or multiple such systems. A GNSS can include, but is not limited to, Global Positioning System (GPS), Galileo, Glonass, Beidou (Compass), etc. SPS satellites are also referred to as satellites, space vehicles (SVs), etc. The SPS receiver 155 processes, in whole or in part, the SPS signals 159 and uses these SPS signals 159 to determine the location of the mobile device 100. A general-purpose processor 111 (also referred to as a controller), memory 140, DSP 112 and/or specialized processor(s) (not shown) may also be utilized to process the SPS signals 159 and/or the signals 123 received via the transceiver 121, in whole or in part, and/or to calculate the location of the mobile device 100, in conjunction with SPS receiver 155. Storage of information from the SPS signals 159 or other location signals (e.g., the signals 123) is performed using a memory 140 or registers (not shown). While only one general purpose processor 111, one DSP 112 and one memory 140 are shown in FIG. 1, more than one of any, a pair, or all of these components could be used by the mobile device 100. The general purpose processor 111 and DSP 112 associated with the mobile device 100 may also be connected to the bus 101.

In some embodiments, the mobile device 100 may also include one or more sensors 130 coupled to the processor 111. For example, the sensors 130 may include motion sensors (also referred to as inertial sensors) to provide relative movement and/or orientation information which is independent of motion data derived from signals received by the transceiver 120, and/or the SPS receiver 155. By way of example but not limitation, the motion sensors may include an accelerometer, a gyroscope, a geomagnetic (magnetometer) sensor (e.g., a compass), an altimeter (e.g., a barometric pressure altimeter, not shown), and/or other sensor types. In some embodiments, the accelerometer may be implemented based on micro-electro-mechanical-system (MEMS). Other types of accelerometers may be used in place of, or in addition to MEMS-based accelerometer. Additionally, a 3D accelerometer, comprising three perpendicularly placed accelerometers, may be implemented (in some embodiments, the 3-D accelerometer may be implemented using three (3) 1-D accelerometers). In some embodiments, the gyroscope may include a gyroscope based on MEMS technology, and may be a single-axis gyroscope, a double-axis gyroscope, or a 3-D gyroscope configured to sense motion about, for example, three orthogonal axes. Other types of gyroscopes may be used in place of, or in addition to, MEMS-based gyroscope. In some embodiments, a magnetometer, configured to measure a magnetic field intensity and/or direction (and, thus, may be configured to measure absolute orientation with respect to the magnetic north) may also be implemented based on MEMS technology. Such MEMS-base magnetometers may be configured to detect motion caused by the Lorentz force produced by a current through a MEMS conductor. Other types of magnetometers may also be used. An altimeter may, for example, be configured to provide altitude data and thus may facilitate determining, for example, a floor in an indoor structure (e.g., an office building, a shopping mall) where the mobile device may be located.

The mobile device 100 may further include a display 160 (and/or some other type of output interface), which is coupled to the bus 101 (optionally via a display adapter 162). The display 160 may include any suitable display, such as, for example, a backlit LCD display, a plasma-display, a CRTbased display, etc., and may further include a touch screen display for additional user input modes. An input user interface 150 may also be included with the device 100, and may provide any suitable interfacing systems, such as a microphone/speaker, keypad, a mouse, etc., to enable user interaction with the mobile device 100. A microphone/speaker, for example, provides for voice communication services (e.g., using wide area network transceivers/access points, and/or the local area network transceivers/access points). The keypad comprises any suitable buttons for user input.

The memory 140 can include a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by the general-purpose processor(s) 111, specialized processors, or the DSP(s) 112. Thus, the memory 140 may be a processor-readable memory and/or a computer-readable memory that stores software 170 (programming code, instructions, etc.) configured to cause the processor(s) 111 and/or the DSP(s) 112 to perform the functions described herein, including, in some embodiments, functions to receive signals at the mobile device from one or more access points associated with one or more areas, computing one or more positioning quality parameters by analyzing the received signals, and determining based, at least in part, on the computed one or more positioning quality parameters whether the mobile device is inside (or outside) at least one of the one or more areas respectively associated with the one or more AP's. Alternatively, one or more functions of the mobile device 100 may be performed in whole or in part in hardware.

The memory 140 may include, among other modules, a positioning module, a received signal strength indicator (RSSI) module, and/or a round trip time (RTT) module. Additional dedicated modules (e.g., a module to compute horizontal estimated position error, or HEPE) may also be included with the mobile device 100. It is to be noted that the functionality of the modules and/or data structures may be combined, separated, and/or be structured in different ways depending upon the implementation of the mobile device 100. For example, the RSSI module and/or the RTT module may each be realized, at least partially, as a hardware-based implementation, and may thus include such devices as a dedicated antenna (e.g., a dedicated RTT and/or RSSI antenna), a dedicated processing unit to process and analyze signals received and/or transmitted via the antenna(s) (e.g., to determine signal strength of a received signals, determine timing information in relation to an RTT cycle), etc.

The positioning module may derive the position of the mobile device 100 using information derived from various receivers/transceiver and modules of the mobile device 100. For example, to determine the mobile device's position based on RTT measurements, reasonable estimates of processing time delays introduced by each access point in communication with the mobile device may first be obtained and used to calibrate/adjust the measured RTTs. The measured RTTs may be determined by the RTT module, which can measure the timings of signals exchanged between the mobile device 100 and the access points to derive round trip time (RTT) information. Once measured, the RTT values may be passed to the positioning module to assist in determining the position of the mobile device 100.

Other information that may be determined from signals received by the mobile device 100 (e.g., using one of its transceivers) includes the received signal power, which may be represented in the form of RSSI (determined using the RSSI module). The RSSI module may also provide data regarding the signals to the positioning module. When using RSSI measurements to determine a mobile device's position, appropriate calibration/adjustment procedures may need to be performed.

A mobile device 100 can estimate its current position within an associated system using various techniques, based on other communication entities within view and/or information available to the mobile device 100. For instance, a mobile device 100 can estimate its position using information obtained from access points (APs) associated with one or more wireless local area networks (LANs), personal area networks (PANs) utilizing a networking technology such as Bluetooth or ZigBee, etc., wireless wide area networks (WWAN), which may include cellular base stations, and/or other wide area wireless systems, such as, for example, WiMAX (e.g., 802.16), SPS satellites, and/or map constraint data obtained from a map server or LCI server, as well as additional information as described in further detail below.

Generally, determining the mobile device's position (including, as will be described in greater detail below, whether the device's location is inside an area associated with an AP or an identifier) includes obtaining data to enable/facilitate location determination, and determining the location of the device based, at least in part, on the obtained data using, for example, multilateration techniques. For example, the mobile device may be configured to determine RSSI or RTT parameters (e.g., using an RTT module and/or an RSSI module) associated with received signals from one or more remote transmitters (e.g., AP's, such as WLAN access points), and based on the known locations of the one or more remote transmitters to determine the position of the mobile device. In another example, the mobile device's position may be determined based on signal profile identification techniques, e.g., by comparing determined parameter values of, for example, RSSI and/or RTT, to stored profiles that are associated with pre-determined positions.

In embodiments in which the device's location is determined based, at least in part, on such metrics as RSSI and/or RTT, measurements of signals received from one or more remote transmitters, e.g., access points (each of which may be identified by an access point identifier, such as a unique MAC address associated with the access point), can be used to determine an estimate of the device's location. For example, a database (which may be stored locally at a memory module housed on the mobile device), containing geographic locations, processing delays, power profiles, RTT profiles, and other such information for multiple access points with known geographical positions, may be accessed and relevant data (e.g., for particular transmitters/access points from which signals at the receiver were received) may be obtained. The database data so obtained may be used to facilitate location determination of the device. For example, the relative distances of the receiver receiving the signals from the transmitters/access points transmitting the signals may be determined based, at least in part, on known locations for those transmitters/access points stored on the accessed database, and an estimation of the location of the device may be computed/derived (e.g., using multilateration procedures, such as a trilateration procedure). As noted, in some embodiments, the position of the mobile device may be also be determined, for example, by comparing the actual measured values of signal strength (or RSSI) and RTT obtained from one or more access points, to stored profiles to identify a profile matching (approximately or precisely) the set of metric values determined by the mobile device. A location estimate associated with a matching stored profile may then be deemed to be an estimate of the current location of the device receiving the transmitters'/access points' signals.

As will be described in greater details below, in some embodiments, probabilistic models may be used for location determination via, for example, a particle filter implementation. In such embodiments, a position of the mobile device may be represented as a probability distribution, and the device's movement may be modeled within, for example, a physical indoor area using a probability distribution. To implement a probabilistic mechanism, a Bayesian or smoothing filter may be applied to location estimates or to a process to determine location estimates. Implementation of a probabilistic mechanism may include consideration of a current location or trajectory of the mobile device. Additionally or alternatively, a Kalman filter or a particle filter may be applied to location estimates or a process to determine location estimates. Other probabilistic mechanisms may also be used. In some implementations, a mobile device's location(s) or estimated location(s) may be represented by multiple particles. Each particle may represent a possible state or location of the mobile device. A combination of multiple particles (e.g., an average, a centroid, a mean, etc.) of a particle cloud, or one or more individual particles, may each be considered at least one estimated location of a mobile device. In response to movement of the mobile device, particles may be propagated according to a probability distribution. Particles may be propagated in accordance with a probability distribution further along a corridor, around a corner, by branching at an intersection, by taking a portal (e.g., a stairway, an escalator, an elevator, etc.) to a different floor, any combination thereof, etc.

Figure 2:
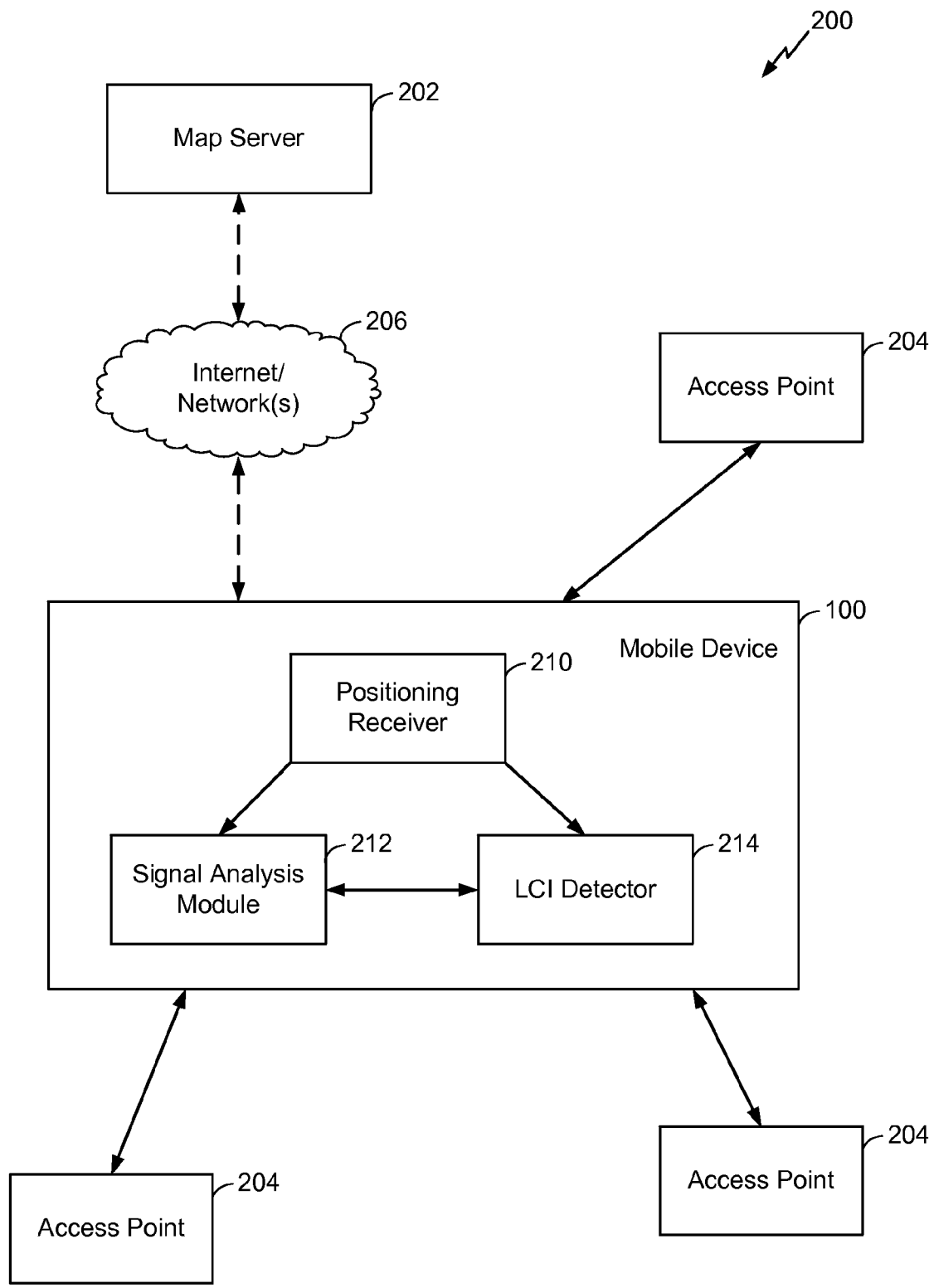
FIG. 2 is a block diagram of a system to determine whether a mobile device is inside a particular area.

Referring next to FIG. 2, a positioning system 200 configured, in part, to detect presence or absence of a mobile device within a given area associated with an AP (and may also be associated with an identifier, such as a location context identifier, or LCI) utilized in implementations such as a QUIPS™ (Qualcomm Indoor-Positioning System) implementation, is shown. As used herein, an LCI may define a geographic area, such as a building or a portion of a building (such as a building's floor). The system 200 includes, for example, a mobile device, such as the mobile device 100 illustrated in FIG. 1, a map server 202, and one or more access points (APs) 204. At least some of the APs 204 are positioned within the area defined/associated with an LCI, and may provide communication service for a surrounding area. At least some of the AP's (and the LCI's or other identifiers) may be associated with pre-defined geographic areas (e.g., a floor of a building, or some portion of a building's floor). Additionally, while not illustrated in FIG. 2 the system may also include location beacons and/or other devices, in addition to, or in place of, the APs 204, which broadcast location-related information but do not provide communication service.

A positioning receiver 210, which may be similar to the wireless transceiver 121 of the mobile device 100 of FIG. 1, or a specialized unit, receives information from the APs 204 and/or other devices, and utilizes this information to aid in determining/estimating position of the mobile device 100. Here, a signal analysis module 212, which may be similar to the positioning module described in relation to FIG. 1, determines positioning quality parameters/metrics associated with received signals. In some embodiments, the positioning quality parameters may be derived from such metrics as RTT (which generally corresponds to the length of time it takes a signal to be sent from a first device to a second device plus the length of time it takes for a reply message to that signal to be received at the first device), RSSI (which is an indication of the power level received by a device), etc., measured and/or computed by the mobile device. In some embodiments, a positioning quality parameters as HEPE (horizontal estimated position error) may also be derived. Based on the signals received from remote transmitters (e.g., remote APs) and the corresponding positioning quality parameters, a detector 214 (which may be realized as a software or hardware implementation realized in the architecture and configuration of the mobile device 100 depicted in FIG. 1) determines, as discussed below, whether the mobile device 100 is located inside or outside of an area associated with a given AP and/or an identifier (e.g., LCI). The positioning functionality of the mobile device 100 may be managed based on whether or not the mobile device 100 is within the given area.

The positioning system 200 may generally be configured as an indoor positioning and navigation system, although the positioning system may also be configured for outdoor positioning (to be used in conjunction with, for example, cellular WWAN access points and/or with global positioning satellites). The positioning and navigation system may be implemented in association with a navigation application, such as a mobile-based navigation application, or any other suitable application. In the context of a navigation application, positioning operations are initialized when a navigation application is opened to request positioning, e.g., by a user or through some automatic process. This initialization may trigger a sequence of operations that may include identification of a particular area in whose vicinity (either inside or outside) the mobile device may be located. For the purpose of illustration, the initialization procedure to identify the area where the device is located will be described below in part in relation to a QUIPS™ system, whose initialization procedure includes LCI discovery, LCI disambiguation, and positioning phases.

In the LCI discovery phase, the mobile device 100 may be configured to connect to a server (e.g., the map server 202) wirelessly or through the internet or network(s) 206, and to request the server to identify LCIs in the vicinity of the mobile device 100 based on an estimated coarse position of the mobile device 100, the media access control (MAC) identifiers visible at the mobile device 100, or other information. In response, the server returns a set of candidate LCIs to the mobile device 100 with AP lists corresponding to those candidate LCIs.

In the LCI disambiguation phase, the mobile device 100 may be configured to use multiple criteria including, but not limited to, the number of APs currently visible from the mobile device for each candidate LCI, maximum received signal strength indication (RSSI) values from each candidate LCI (as measured and/or computed by a RSSI computation module implementation for signals received at the mobile device's transceivers), median RSSI values from each candidate LCI, or other metrics, to choose a most likely LCI in which the mobile device 100 is located from the candidate list.

The positioning phase may be conducted based on RSSI, round trip time (RTT) information, and/or other suitable information. In the positioning phase, once an LCI has been chosen as the likely LCI the mobile device likely is located in or near, targeted scans of the APs 204 limited to that LCI provide relevant information relating to RSSI, RTT, etc., as utilized by, for example, a positioning engine (PE) implementation realized on the mobile device 100. These scans are performed periodically, and the PE can produce either a single shot fix (referred to herein as a "single-fix mode") or track the mobile over time using a particle filter (referred to herein as a "tracking mode"). As noted, the particle filter may utilize a model (also referred to as a mobility model), such as a pedestrian mobility model, to smooth the overall trajectory of the mobile device 100 as tracked over time based on samples, or particles, of the position of the mobile device 100. The positioning system may also interact with a location manager (e.g., to manage, for example, transitions of positioning between an indoor positioning system and a GNSS system, or the like). Additionally and/or alternatively, and as will become apparent below, the positioning phase may also include a process to determine, based on positioning quality parameters derived from receive signals and/or signal metrics, whether the mobile device is located inside or outside an area(s) associated with an AP or an LCI (or some other identifier) determined to be in the area in which the mobile device may be located. In embodiments in which more than one LCI is identified as potentially corresponding to the device's location, determination of whether the device is located inside or outside ("In/Out determination") any of the areas associated with those AP's and/or LCI's is performed. In some embodiments, these In/Out determinations may be performed separately/independently of the positioning phase.

In some embodiments, when the mobile device 100 is powered on and/or activated and the positioning system is enabled, the positioning system determines at least a rough location of the mobile device 100, e.g., a building, if any, in which the device is located and the floor and/or sub-area of the building. The positioning system subsequently obtains a map for the determined area, either by receiving map information from the map server 202, or by retrieving map data locally stored at the mobile device 100. As noted above, a procedure to identify at least one pre-defined area associated with at least one access point (that may be associated with an LCI or some other identifier) in which the mobile device 100 may be positioned may then be performed, and a determination may be made whether the mobile device is inside or outside that at least one pre-defined area based on positioning quality parameters (e.g., parameters based on HEPE computations, RSSI computations, RTT computations, etc.) as will be discussed in greater details below.

The need/motivation to determine, in some embodiments, whether a mobile device is inside a particular pre-defined area can be illustrated by the following examples. In some implementations, when a mobile device, such as the mobile device 100 depicted in FIGS. 1 and 2, is moved from one area to another, a positioning system may encounter location-determination problems due to difficulties in unambiguously identifying different areas (associated with different AP's/identifiers). For instance, upon the positioning system determining that a device is located within a given building and/or on a particular floor, the positioning system may continue to determine that the mobile device 100 is located inside the building regardless of the actual location of the device as long as the device continues to receive signals from inside the building. Similarly, the positioning system may in some cases determine that a device has entered a building upon receiving signals from APs within the building even when the device has not in fact entered the building. Consider, for example, a situation where a multistoried building has only one retail floor and a user carrying a mobile device (that may have an indoor positioning application) is traveling in the vicinity of the building (either inside or outside the building, and/or around the retail floor of the building). If the mobile device is located outside the retail floor, the device may nevertheless continue to receive WiFi signals from access points associated with the retail floor, thus possibly resulting in an erroneous determination that the mobile device is located within the retail floor. Thus, implementations to determine, based, at least in part, on positioning quality parameters whether the mobile device is located inside (or outside) the retail floor can mitigate resultant erroneous determinations that the mobile device is located within a particular pre-defined area when in fact the mobile device is outside such a particular pre-defined area. In some embodiments, the procedures described herein to determine whether a device is inside particular pre-defined areas may also be used to facilitate determination of whether the device is located indoor or outdoor.

To enable a device, such as the device 100 depicted in FIGS. 1 and 2, to resolve location ambiguity resulting from the device 100 receiving signals from AP's that are associated with areas that may be different from the current area where the device is currently located, the system 200 (and/or the mobile device 100) is configured to detect whether the mobile device 100 is inside a particular area associated with a particular access point(s) (or with a particular identifier, such as a particular LCI, associated with the particular area). Various conventional positioning systems and techniques may be implemented based on an assumption that a positioning bounding box (or BB), such as a rectangle (or some other geometric shape), encompasses an area described by a map associated with a particular AP or identifier. Based on the shape and orientation of the corresponding building, this could mean that certain exit points from the building are on the edge of the BB while others may be well within the BB. In general, this lack of accurate building boundaries prevents/inhibits the positioning engine from identifying whether a given position fix is inside a particular area associated with a particular access point (s) (or associated with an identifier, such as an LCI). For point of exit at the edge of the BB, the lack of connectivity to the area outside the pre-defined area associated with the access point (and/or the identifier) implies that a particle filter implementation, for example, may continue to provide position fixes within the BB even as the mobile device 100 exits the building. Similarly, in circumstances where a mobile device initiates positioning operations outside the BB, but nevertheless receives signals from AP's located within, and associated with, the area defined by the BB, the mobile device's resultant determined location may be one corresponding to a position that is within the BB.

Moreover, for a portion of a grid that is exterior to, for example, a building, measurement heat maps are generated with an assumption of free space propagation due to unavailability of map features. Nodes on the exterior are assumed to be feasible points for propagation and weighted equally in a utility map (a utility map is a map containing a soft measure of the likelihood of utilization of each part of the map by a given user). The lack of map features could cause the positioning results within this area to be of lesser quality than points within the area with the full-featured map. Position fixes obtained when the mobile device is in such an exterior area may thus be associated with a large error, with some of those position fixes falling in an area that is within the building (notwithstanding that the device may be in fact positioned outside of the building). In some implementations, when a mobile device is determined to be outside a particular area associated with an AP(s) and/or with an identifier (e.g., LCI), the mobile device may activate another positioning/navigational system/functionality. For example, if it is known that an area outside a particular pre-defined indoor area with respect to which the mobile device performs an In/Out determination is an outdoor area, then upon a determination (e.g., based on positioning quality parameters) that the mobile device is outside that pre-defined indoor area, the mobile device may be configured to cause its outdoor navigation system to be activated (e.g., activate a GNSS receiver and associated satellite positioning applications available on the mobile device).

In some embodiments, when a mobile device located outside of a tight BB turns on its particle filter, and an AP and/or identifier is selected, the mobile device may be constrained to a position within the BB for that the selected AP or identifier. After the first fix, the particle filter generally runs in tracking mode and the mobility model based on random walk will, in most cases, keep the particles with the largest weights in a tight cluster. Generally, a computed Horizontal Estimated Position Error (HEPE) value, which corresponds to an estimated inaccuracy of the positioning system with respect to the ground, can converge to a small value within a few fixes. However, as will become apparent below, in some embodiments, a mobile device may be configured to not display a fix when the mobile device is determined to be located outside the BB (a user monitoring the positions determined by a mobile device may prefer to not be presented with erroneous positioning information that place the location of the user inside the BB, notwithstanding that the device the user is using is outside the BB).

In some embodiments, when a mobile device (such as the mobile device 100 of FIGS. 1 and 2) turns on a positioning application, an LCI discovery and disambiguation procedures may be performed to identify the most likely candidate LCI from among several candidates based, for example, on proximity to a known location or scanned known wireless APs 204. In some embodiments, assistance data, such as an indoor map of the region in which the mobile device is located may be obtained from a remote server (e.g., a server operated by proprietors of an indoor structure, such as a building or shopping mall, where the device may be located, or from a server, such as the map server 202, which may be operated by independent map makers). In some embodiments, the map may be limited to cover the area where localization is desired. In embodiments in which the positioning system includes a particle filter implementation, the particle filter may be constrained to nodes/points on a gridded map for the selected LCI. Consequently, in such embodiments, the particle filter can only determine positioning fixes that fall within the BB. Thus, a mobile device 100 outside the BB bounding the area where localization is desired may report measurements from APs 204 within the LCI, possibly resulting in an erroneous determination that the device is positioned inside the BB. As noted, determining a position for a mobile device that is inside a BB although the mobile device's actual location is outside the BB degrades user experience and may compromise position determination functionality as a mobile device leaves one area associated with one LCI and enters another area associated with another LCI. Thus, to mitigate such erroneous location determination, here too the system 200 is configured to identify when the mobile device 100 is inside or outside a particular area associated with a particular LCI (or some other identifier) and/or with a particular AP. In some embodiments, in response to a determination that the mobile device is outside the BB, the mobile device may be configured to perform one or more of, for example, adjust the positioning mode for the mobile device (e.g., single-fix or continuous/tracking mode) as more particularly described in relation to FIG. 3, terminate positioning functionality and/or any executing navigation application(s), transition from indoor positioning mode to outdoor positioning mode if it is known that the area outside the BB is an outdoor area, and/or prompt the user to indicate what positioning mode or functionality should be used.

Several procedures/techniques may be implemented to facilitate determination of whether a mobile device is inside a particular area (which may be associated with one or more AP's and/or identifiers). For example, with reference now to FIG. 3, a flowchart of an example positioning procedure 300 is shown. The procedure 300 is configured to make a determination of whether a mobile device (which may be running an implementation of the procedure 300) is inside or outside (also referred to as an In/Out determination/test) one or more areas (which may be associated with respective one or more AP's and/or with one or more identifiers, such as LCIs) and to perform certain actions, e.g., enable display of a position fix representative of the determined location of the mobile device, based, at least in part, on the In/Out determination. In some embodiments, the procedure 300 is implemented based on computation positioning quality parameters, such as a horizontal estimated position error (HEPE) parameter derived from signals received from one or more remote transmitters (AP's), RSSI parameters, parameters based on round trip times (RTTs) or ranges between mobile device and APs, as well as other types of positioning quality parameters (which may be referred to as just "positioning parameters").

Figure 3:
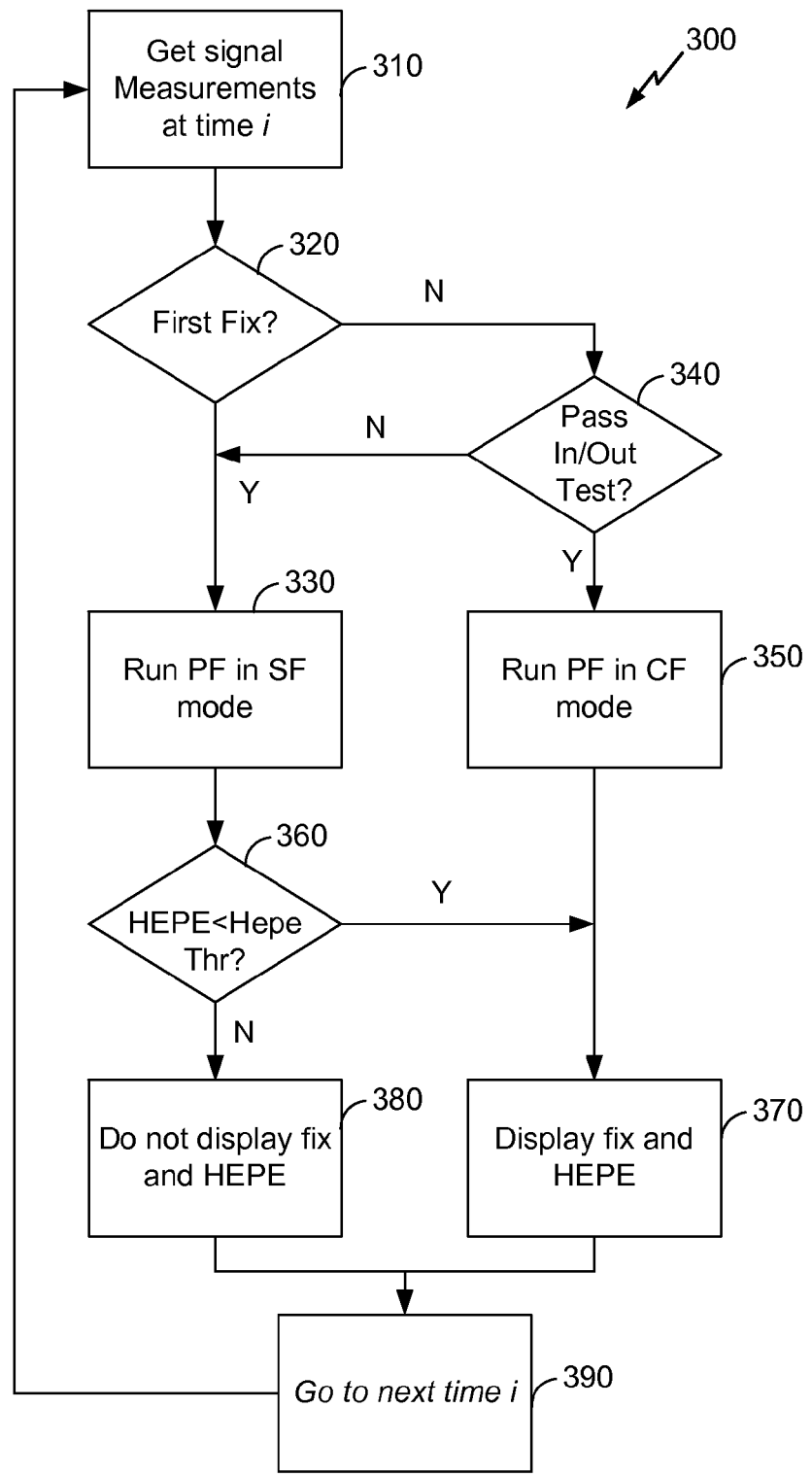
FIG. 3 is a flow diagram of a procedure for operating a positioning system associated with a mobile device.

Accordingly, as illustrated in FIG. 3, a positioning system (e.g., implementing a particle filter or implementing some other position determination mechanism) obtains 310 signal measurements at some time instance i. As noted, some predefined area associated with an access point (which may also be associated with an LCI, or some other identifier type) may have already been determined/selected (e.g., via a positioning engine implementation realized on the mobile device) as being associated with the present location of a mobile device, e.g., an LCI disambiguation process may have been completed and the position of a mobile device may subsequently be determined based on signaling information received from the AP's associated with the selected LCI. In some embodiments, based on the signals received by the mobile device, parameters, such as RTT, RSSI, etc., are derived (which may be performed as part of the operations 310), and the mobile device's position may be more accurately determined based on those derived parameters. For example, in some embodiments, a position of the mobile device at time instance i may be determined based, for example, on one or more multilateration techniques that use RTT and/or RSSI values derived/computed from the signals received at time instance i from one or more AP's (e.g., AP's associated with a previously selected LCI). The derived position at the time instance i may correspond to a single-fix location, which then may or may not be used as the device's determined location, depending on further processing performed by the procedure 300 of FIG. 3.

Having determined the position (e.g., a position fix) of the mobile device at the time instance i, a determination is made 320 of whether the determined position fix is a first fix. If the position determined at time instance i is in fact the first position fix (and therefore it may be premature to perform the positioning determination procedure in tracking mode), a particle filter implementation of the positioning procedure employed to determine the position of the mobile device is run 330, at least initially, in single fix mode. However, if, on the other hand, it is determined (at 320) that a position fix has previously been determined (for example, by maintaining a flag that is set to a value indicating that a position fix was made as soon as such an operation was performed, or by any other mechanism to indicate a previous position fix determination), an In/Out determination (e.g., determining whether the mobile device is inside an area associated with the presently determined access point or identifier such as an LCI) is performed 340. In response to a determination, using the In/Out test, that the device location is likely outside the area associated with the currently determined AP or LCI, the particle filter is run in single fix mode (at 330). However, in response to a determination, using the In/Out test, that the device's location is likely be inside the currently determined pre-defined area, the particle filter is run in continuous/tracking mode to thus track particles representative of possible locations determined through the probability-based modeling implemented by the particle filter.

An In/Out test (e.g., to determine if a current device location estimate is inside or outside the area associated with the currently determined AP or some identifier) may be implemented using one of several possible approaches. For example, in some embodiments, an RSSI-based test and/or an HEPE-based test, may be used. In an RSSI-based test, a determination is made whether at least one of the AP's (such as the AP's 204 depicted in FIG. 2) with current RSSI measurements is stronger than some pre-determined RSSI threshold (e.g., −80 dB) to which the RSSI measurements are compared. In some embodiments, the RSSI threshold may not be a fixed threshold, but may be determined based on interaction with a map or other assistance data that may have been obtained (e.g., predicted attenuation based on distance and number of walls), or via map annotations (such as those based upon crowd-sourced measurements) or other information provided in relevant assistance data. As noted, if the test fails (e.g., none of the RSSI values computed from signals received from the AP's exceeds the pre-determined RSSI threshold) the device's current location the fix type is set to single-fix regardless of the outcome of a HEPE-based test.

With regard to a HEPE-based test, a particle filter is generally configured to use a cloud of particles to represent a probability distribution function (PDF) of the position of the mobile device, with the HEPE metric/measurement representing the spread of the cloud in the X and Y dimension. The HEPE may thus be computed as follows:

$$HEPE = 1.73\sqrt{\sigma_x^2 + \sigma_y^2},$$

where $\sigma_x$ and $\sigma_y$ represent the standard deviations of the resampled particle positions in the local X and Y directions. The computed HEPE value can then be compared to a pre-determined HEPE threshold (that may be representative of the maximum tolerable HEPE). For instance, if variances of 10 (with distance units provided in meters) in each of the X and Y directions are identified as the maximum tolerable error in tracking mode, a HEPE threshold of 24.47 m (approximately 80 ft) is obtained. This threshold, or another suitable threshold, can be used as the threshold in the procedure described herein to control mode switching in a particle filter implementation (from single-fix mode to tracking mode, or vice versa). Thus, in some embodiments, a determination that the In/Out passed (e.g., the device's location is likely within a pre-defined area associated with a particular AP or identifier) occurs when at least one of the RSSI values from signals received from APs exceeds a pre-determined RSSI threshold, and/or a computed HEPE value, for example, exceeds some pre-determined HEPE threshold. In some embodiments, a determination that the In/Out test passed may be obtained when only one of those conditions is met (e.g., either at least one of the RSSI values exceeds the pre-determined RSSI threshold or the computed HEPE value exceeds the pre-determined HEPE threshold) and/or when other conditions/rules that are based on other parameter values derived from received signal (e.g., RTT) are met. For example, in an alternate technique using RTTs or ranges, measured RTTs or ranges are compared to expected RTTs or ranges at the position fix from the PF such that a mathematical function of the mismatch is used to determine if the fix is inside or outside a given LCI. In some embodiments in which determination of whether a mobile device is located inside a pre-defined area associated with an AP and/or an identifier is performed using RTT-based values, when a range to a particular AP (e.g., determined using range heat maps) exceeds a maximum range value, this may be indicative that the mobile device is outside the pre-defined area for the particular AP or identifier.

As noted, when the In/Out test indicates a pass (e.g., mobile device is inside the pre-defined area for the particular AP or identifier), the particle filter may operate in continuous/tracking mode (depicted as operation 350 in FIG. 3), whereas when the In/Out test indicates a fail, the particle filter may operate in single-fix mode (as depicted in operations 330 of FIG. 3). As noted, in this mode, the particle filter evaluates a set of particles that comprises the entirety of the feasible nodes. In other words, the measurement likelihood is calculated at every single feasible node from which N particles are sampled based on a cumulative distribution function (CDF) used by the particle filter implementation. However, this could be computationally expensive to sustain for extended periods on the mobile station 100, especially for large maps encompassing several thousands of nodes. One way to mitigate such complexity is by choosing, in some embodiments, a subset of the set of feasible nodes by uniformly sampling across the grid. This has the effect of computing the likelihoods at nodes spaced at a multiple of the original (e.g., 2 foot) separation between nodes.

As further shown in the flowchart of the procedure 300, single-point fixes are displayed to the user only when the HEPE, for example, is below some specified HEPE-Display threshold (e.g., approximately 24.5 m in the example in which maximum variance of 10 m in the X and Y directions are specified). When the computed HEPE exceeds the HEPE-Display threshold, the mobile device may not display any position fix, or may display the most recent fix corresponding to a HEPE value that was below the threshold. The HEPE-Display threshold used in the determination made at operations 360 may be the same or a different threshold than the HEPE threshold used in performing the In/Out test at the operations 340. By determining (at 360) whether the HEPE value is below the HEPE-Display threshold, the procedure 300 prevents display of a position fix when the computed HEPE value is too large. Accordingly, in the example embodiments of the procedure 300, when the particle filter implementation is in single-fix mode and the computed HEPE value is determined to be below the HEPE-display threshold, the computed positional fix and the HEPE value are displayed 370 (the position fix and HEPE values are also displayed when the particle filter implementation is in tracking mode). In some embodiments, the computed value of the HEPE may be displayed either an actual numerical value, or through some graphical representation indicative of the value of the HEPE (e.g., a circle or ellipse, centered at the determined position of the mobile device, and whose radius may be proportional to the computed value of the HEPE. On the other hand, when the computed HEPE value exceeds the HEPE-Display threshold, and with the particle filter operating in single-fix mode, neither the current computed positional fix, nor the current computed HEPE values are displayed (as illustrated at 380). Upon completion of the processing associated with the device's location at time instance i, the operations performed by the procedure 300 commence for the next time instance (as illustrated at 390) by obtaining (e.g., at 310) signal measurements for the next time instance.

In some implementations, the positioning application can swap displayed maps upon determination that the mobile device (such as the mobile device 100) has left a particular area associated with a given AP and/or an identifier (e.g., LCI), and display the device's location on a newly displayed map in order to provide continuous positioning. This map swapping can include both transitions between indoor maps, e.g., a map of a first LCI using an indoor positioning engine and a map of a second AP and/or LCI using the same or a different indoor positioning engine, and/or transitions between indoor and outdoor maps, e.g., a map of an indoor AP/LCI using an indoor positioning engine, and an outdoor map of a geographic region using, for example, a satellite positioning engine. In the indoor-outdoor case, the transition between positioning engines may be triggered by the In/Out logic described herein.

Figure 4:
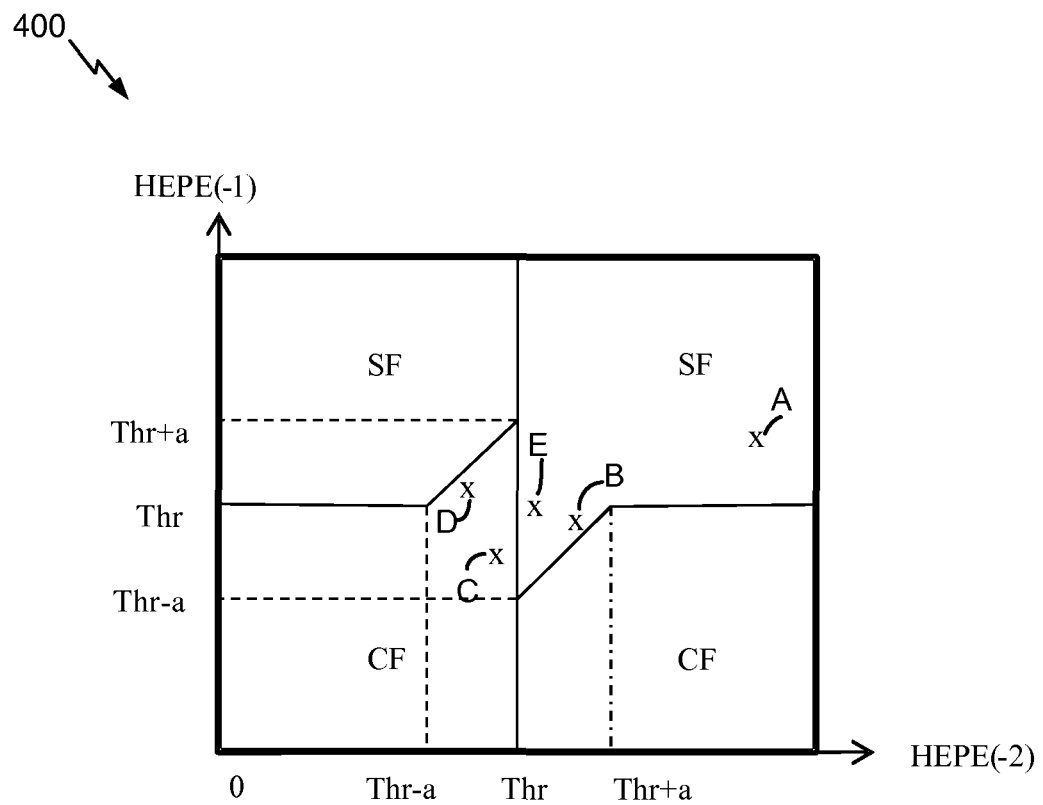
FIG. 4 is an illustrative view of a graph defining a control mechanism utilized for managing positioning modes associated with a mobile device.

In some embodiments, to prevent a fix type from experiencing a "Ping-Pong" effect by repeatedly transitioning between single-fix and tracking modes, an implementation to realize the logic illustrated by a graph 400 of FIG. 4 may be used. The implementation corresponding to FIG. 4 may be based on the use of HEPE computations/calculations from two fixes preceding the measurements to compute a current fix, and use of a pre-determined threshold value (Thr) to prevent/inhibit switching modes when the difference (e.g., absolute value difference) between the two preceding HEPE values is less than some pre-determined value a (e.g., 2 m, 4 m, or any other appropriate value). Thus, the computed HEPE values, for example, for the preceding two position fixes are obtained (previous values of computed positioning quality parameter, such as HEPE values, may be stored in memory storage of the mobile device and retrieved as needed) to determine if the current fix should be provided in single shot mode or in tracking mode. FIG. 4 includes a graphical representation of regions where single-shot or tracking modes are to be used based on the preceding two computed HEPE values and the selected threshold value. In the example implementation of FIG. 4, the threshold value, Thr, is set to 25 m, and a is set to 2 m. As such, FIG. 4 provides a hysteresis implementation for switching from one mode to another in accordance with the preceding two HEPE values.

More particularly, consider an example based on the following sequence of time samples/timestamps (provided in time units of seconds), and corresponding HEPE values (provided in meters):

| | | | | Time | | | | |
|---|---|---|---|---|---|---|---|---|
| | 1 | 2 | 3 | 4 | 5 | 6 | 7 | 8 |
| HEPE | 50 | 35 | 26.5 | 24.8 | 24 | 25.5 | 25 | 27 |

If the initial values for HEPE(−1) and HEPE(0) are set to large values (e.g., 200) and rules represented by the configuration of the graph 400 of FIG. 4 are applied, the following sequence of fix types (single-fix mode, or "SF", versus continuous-/tracking-fix mode, which is annotated as "CF") for a particle filter is obtained:

| | | | | Time | | | | |
|---|---|---|---|---|---|---|---|---|
| | 1 | 2 | 3 | 4 | 5 | 6 | 7 | 8 |
| Fix Type | SF | SF | SF | SF | SF | CF | CF | SF |

To illustrate operation of the procedure implementing the hysteresis behavior of FIG. 4 that resulted in the fix-mode sequence of the above table, consider the fix mode determinations for times 4-8. At time 4, the computed HEPE value for time 3 (i.e., HEPE(−1)) and at time 2 (i.e., HEPE(−2)) are 26.5 and 35, respectively. These two HEPE values correspond to an approximate point A in the graph 400 of FIG. 4 which is in an "SF" region. Thus, the fix mode at time 4 remains single fix (SF). At time 5, HEPE(−1) is 24.8, and HEPE(−2) is 26.5, corresponding to the point B in the graph 400 of FIG. 4 which is also in the same SF region as point A. Thus, at time 5 the fix mode remains SF.

At time 6, HEPE(−1) is 24 (the HEPE value computed at time 5) and HEPE(−2) is 24.8. These HEPE values are mapped to an approximate point C on the graph 400 of FIG. 4 which is located in a CF region. Thus, the fix mode at time 6 changes to tracking mode. At time 7, HEPE(−1) is 25.5, and HEPE(−2) is 24, corresponding to an approximate point D on the graph 400 of FIG. 4 which is also in the same CF region where point C is located. Accordingly, the fix mode remains in continuous/tracking mode.

Finally, at time 8, HEPE(−1) is 25 and HEPE(−2) is 25.5, corresponding to point E on the graph 400 which is located inside the SF region where points A and B are located. Therefore, the fix mode, for the particle filter implementation realized on the mobile device, switches to single-fix mode. Thus in some embodiments, a mobile device may be configured to disable/prevent transitions between single-fix mode and continuous/tracking mode based on values for at least one historical positioning quality parameter for one or more previous fixes.

A positioning system, such as the system 200, may further utilize various procedures/techniques to enhance detection of the presence, or absence of, the mobile device 100 within a particular area associated with a particular LCI. For example, in some embodiments, the system 200 may be configured to add an extension to an original BB map (when possible) in order to allow graceful transition of position fixes from inside a particular area associated with a particular LCI to outside that particular area, and to detect position fixes to be outside the particular area associated with the particular access point or identifier (e.g., LCI) when they cross the original BB. The BB extension may include, for example, a layer of white space to a map (e.g., a rectangular map) that encompasses the pre-defined area associated with a particular AP(s) and/or identifier (such as an LCI). Such a BB extension may be added to maps (e.g., of indoor areas) provided, for example, by venue owners/operators of a venue that includes the pre-defined area associated with the particular AP and/or identifier. Such maps (or other assistance data) sometimes do not include layers or features outside the pre-defined areas corresponding to the maps/assistance data provided. The BB extension thus enable to extend the areas where computations (e.g., positioning computations) are allowed. In some embodiments, the BB may be extended by a fixed amount (e.g., 20 m, or some other values) from all the BB's sides in order to facilitate determination of whether the positioning fix is within the tight (e.g., original) BB. When the mobile device 100 is located in the extended area, a particle filter implementation used to determine the mobile device's location may return position fixes with accuracy lower than that expected in the tight BB, but enough to pass a threshold test to continue in tracking mode (as will be discussed in greater detail in relation to FIG. 3). However, by knowing the dimensions of the original (tight) BB boundaries, the positioning application may be configured to filter out positions that may fall in the extended area. When the mobile device 100 is inside the extended BB, the fixes may either fall within the extended area or in the tight BB. Fixes within the extended BB can be filtered out by the application, while fixes within the tight BB are generally accompanied by a large HEPE (i.e., in situations where the mobile device's true position is outside the tight BB) and can be detected by an improved In/Out test, as more particularly described below.

Extending the BB associated with a particular area also allows for graceful degradation of positioning accuracy as the mobile device moves from within a particular area to outside of that particular area. Because the extended BB area (i.e., the area that includes the whitespace outside of the pre-defined area bounded by the tight BB) assumes complete connectivity and lacks map features, the particle filter's positioning accuracy within the extended BB will be reduced and the HEPE will thus increase. As the mobile device 100 moves further away from the tight BB, it will report measurements from fewer APs that are closer to the exit.

In certain scenarios, the same set of APs with similar measurements can lead to several clusters of nodes situated in different parts of the building or other area. By switching the particle filter mode to obtain single-point fixes, the presence of these clusters can be detected using HEPE measurements that are based on all of the resampled particles spread across the grid. Similarly, when the mobile device 100 is outside the BB, the particle filter may return position fixes with high uncertainty values (e.g., high error values), causing a particle filter implementation to wait until the mobile station has moved to a location inside the BB and/or until a computed HEPE has fallen below some pre-determined threshold (and/or until other positioning parameters satisfy various conditions) before reporting position fixes. In some embodiments, the mobile device (such as the mobile device 100 of FIGS. 1 and 2) may include a universal location provided (or ULP) configured to determine whether to activate an on-board GNSS to perform satellite positioning based navigation. For example, in response to some pre-determined number of position determination that are indicated to be out of the tight BB, the mobile device may be configured to switch to its satellite-based navigation system.

Further, in some embodiments, when the mobile device 100 is determined to possibly be located outside an area associated with some LCI, the system 200 may run the particle filter in a single-fix mode. In this mode, prior history of particle motion is ignored and the entire grid is evaluated for measurement likelihood. By doing so, the particle filter is prevented/inhibited from running in tracking mode when the tracking mode would cause the particle filter to get stuck in a portion of the area associated with the particular AP or identifier (e.g., LCI) when the true position is in fact outside that area. In the tracking mode, particles associated with a determined position estimation are constrained to be located within a given distance of a previous fix (based on the particular mobility model utilized). It is to be noted that in the single-fix mode, the likelihood for a given fix is calculated at all nodes on the map, which may result in multiple clusters of possible solutions. Thus, while in the single-fix mode, an estimated device location may appear to move suddenly between locations. Further, in the context of a building's map, position fixes obtained via a single-fix mode may cause subsequent fixes to cross walls or fall in otherwise unlikely positions which would not be returned in tracking mode.

Figure 5:
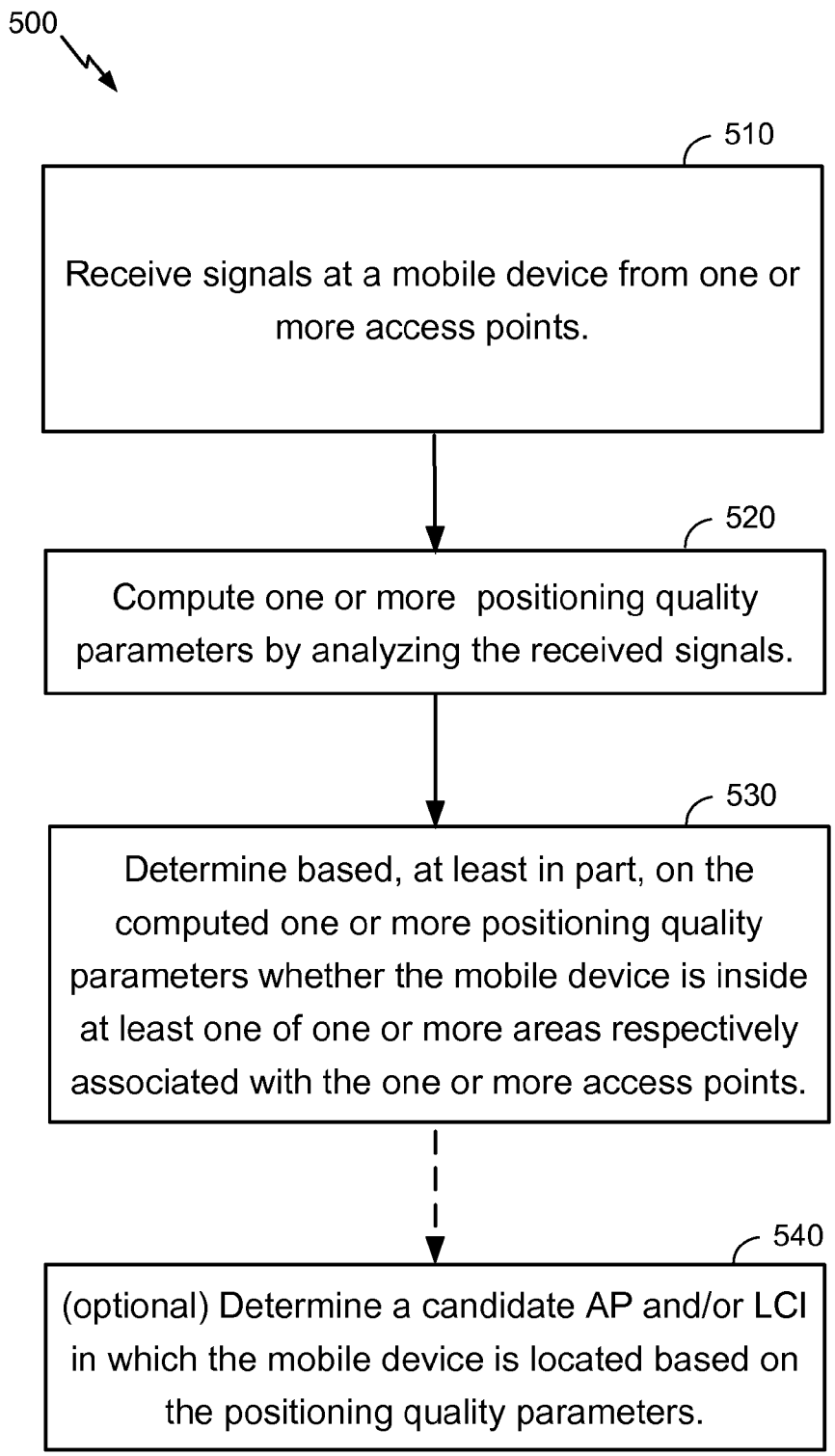
FIG. 5 is a block flow diagram of a procedure to determine whether a mobile device is inside a particular area.

Referring to FIG. 5, and with further reference to FIGS. 1-4, a mobile device-implemented procedure 500 to detect whether a mobile device 100 is inside or outside of a particular area is shown. The procedure 500 is, however, an example only and not limiting. The procedure 500 can be altered, e.g., by having stages added, removed, rearranged, combined, and/or performed concurrently. Still other alterations to the procedure 500 as shown and described are possible.

As shown, signals are received 510 at a mobile device (such as the mobile device 100 depicted in FIGS. 1 and 2) from one or more access points (such as the AP's 204 depicted in FIG. 2), which may be associated with one or more identifiers (e.g., location context identifiers, or LCI's). In some embodiments, the mobile device may be part of a positioning system that enables determination of an AP or an identifier likely associated with the present location of the mobile device. Determination of the likely AP or identifier (such as an LCI) may be performed through an LCI discovery and LCI disambiguation processes as described herein. In some embodiments, once the likely AP or LCI (or some other identifier) associated with the present position of the mobile device is identified, a position fix for the device's location may be determined based, at least in part, on signals received by the mobile device from remote transmitters such as the AP's associated with the mobile device's location.

Having received signals from the AP's associated with the mobile device's location, one or more positioning quality parameters, such as RSSI-based parameters, horizontal estimated position error (HEPE)-based parameters, RTT-based parameters (e.g., parameters derived from, for example comparisons between received and expected RTTs), or other suitable parameters, are computed 520 based on the received signals (e.g., by analyzing the signals received).

Based, at least in part, on the computed positioning quality parameters, a determination is made 530 as to whether the mobile device is inside at least one or more areas (e.g., pre-defined areas) respectively associated with the one or more access points. In some embodiments, the at least one area, with respect to which a determination is made whether the device is located inside (or outside) that area, may be associated with an identifier, such as an LCI.

As noted, in some embodiments, a procedure, such as the procedure 300 depicted in FIG. 3, may be used, at least in part, to determine the location of the mobile device vis-à-vis a given area associated with an LCI. For example, an In/Out test, such as the one described in relation to the operations 340 of the procedure 300, may be used to determine if the mobile device is inside or outside the area associated with a particular LCI. For example, the mobile device may be determined to be inside a particular area when signals from at least one AP received by the mobile device have a computed RSSI that exceeds some pre-determined threshold, and/or when a computed HEPE parameter is below some pre-determined HEPE threshold. Other ways, techniques, processes and/or tests to determine whether the mobile device is inside or outside a particular area(s) associated with a particular LCI(s) (or some other identifier) may be used.

In some embodiments, upon completion of the operations of 530, there may be several possible candidate AP's and/or LCI's (or some other identifiers) in which the mobile device may be determined to be located (i.e., in such embodiments, LCI disambiguation processes may not have been performed or may not have resulted in identification of a particular LCI). Thus, in such embodiments, an AP and/or LCI (from the candidate AP's and/or LCIs) may optionally be determined 540 based on the positioning quality parameters and/or the determinations made at 530 as to whether the mobile device is inside or outside the one or more areas associated with respective one or more AP's and/or LCIs.

Thus, as described herein, positioning systems (such as the positioning system 200 of FIG. 2) implement various techniques and procedures to provide improvements over existing techniques for indoor/outdoor detection. These implemented techniques/procedures include:

1) Extending the bounding box for LCIs with exits to the outside, e.g., by 20 m or by some other value.

2) Prior to a position fix, performing an In/Out test based on, in some embodiments, RSSI, RTT, and/or HEPE values to enable determination of the particle filter's fix type (e.g., single-point fix or continuous/tracking mode).

3) In situations where single-point fix mode is used, refraining from returning fixes to the user under certain circumstances (e.g., when the HEPE value exceeds some predetermined HEPE-Display threshold). This includes situations involving outdoor location determination procedures, and in some cases the first few fixes after filter initiation.

4) If single-point fix mode is used, reducing the number of nodes evaluated to a subset of the total available feasible nodes that could be evaluated.

Figure 6:
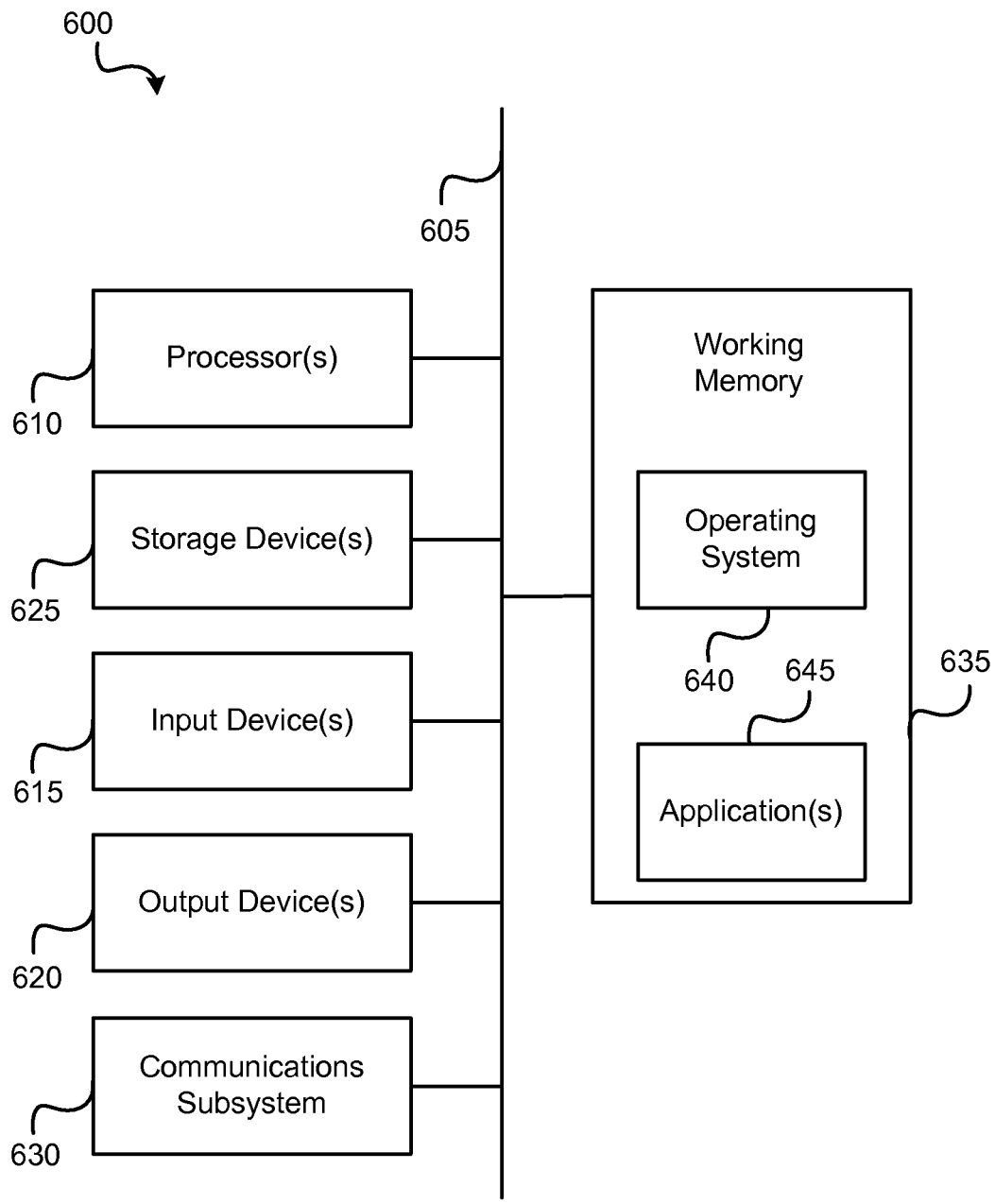
FIG. 6 is a block diagram of an example of a computer system.

With reference now to FIG. 6, a computer system 600 may be utilized to at least partially implement the functionality of one or more of the previously described computerized devices (e.g., the mobile devices, AP's, etc., of FIGS. 1 and 2). FIG. 6 provides a schematic illustration of one example embodiment of a computer system 600 that can perform the procedures and methods provided by various other embodiments, as described herein, and/or can function as a mobile device or other computer system. FIG. 6 provides a generalized illustration of various components, any or all of which may be utilized as appropriate. FIG. 6, therefore, broadly illustrates how individual system elements may be implemented in a relatively separated or relatively more integrated manner.

The computer system 600 includes hardware elements that can be electrically coupled via a bus 605 (or may otherwise be in communication, as appropriate). The hardware elements may include one or more processors 610, including, without limitation, one or more general-purpose processors and/or one or more special-purpose processors (such as digital signal processing chips, graphics acceleration processors, and/or the like), one or more input devices 615, which can include without limitation a mouse, a keyboard and/or the like, and one or more output devices 620, which can include without limitation a display device, a printer and/or the like. The processor(s) 610 may include, for example, intelligent hardware devices, e.g., a central processing unit (CPU) such as those made by Intel® Corporation or AMD®, a microcontroller, an ASIC, etc. Other processor types could also be utilized.

The computer system 600 may further include (and/or be in communication with) one or more non-transitory storage devices 625, which may include, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), other various transceiver types, and/or the like. The communications subsystem 630 may permit data to be exchanged with a network, other computer systems, and/or any other devices described herein. In some embodiments, the computer system 600 may further comprise a working memory 635, which can include a RAM or ROM device.

The computer system 600 may also comprise software elements, shown as being currently located within the working memory 635, including an operating system 640, device drivers, executable libraries, and/or other code, such as one or more application programs 645 (such as those described in relation to FIG. 1), which may include computer programs provided by various embodiments, and/or may be implemented to realize methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the methods and procedures described herein.

A set of these instructions and/or code might be stored on a computer-readable storage medium, such as the storage device(s) 625 described above. In some cases, the storage medium might be incorporated within a computer system, such as the system 600. In other embodiments, the storage medium might be separate from a computer system (e.g., a removable medium, such as a compact disc, memory sticks, etc.), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. For example, in some embodiments, special purpose logic circuitry, e.g., an FPGA (field programmable gate array), a DSP processor, or an ASIC (application-specific integrated circuit) may be used in the implementation of the computer system 600. Further, connection to other computing devices such as network input/output devices may be employed.

A computer system (such as the computer system 600) may be used to perform the methods and procedures in accordance with the disclosure. Some or all of the procedures and methods may be performed by the computer system 600 in response to processor 610 executing one or more sequences of one or more instructions (which might be incorporated into the operating system 640 and/or other code, such as an application program 645) contained in the working memory 635. For example, the computer system 600 may be configured to perform procedures including procedures such as determining whether location of a mobile device is inside or outside an area(s) associated with access point and/or an identifier (such as an LCI) based, at least in part, on computed positioning quality parameters. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In some implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible (also referred to as "non-transitory") computer-readable media include, for example, a floppy disk, a flexible disk, hard disk, magnetic tape, or any other magnetic medium, a CD-ROM, a Blu-Ray disc, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

The methods, systems, and devices discussed above are examples. Various alternative configurations may omit, substitute, or add various procedures or components as appropriate. For instance, in alternative methods/procedures, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide an understanding of example configurations (including implementations). However, configurations may be practiced without these specific details. For example, well-known circuits, processes, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as processes which are depicted as a flow diagram or block diagrams. Although each may describe the operations as sequential processes, many of the operations can be performed in parallel or concurrently. In addition, the order of the operations may be rearranged. A process may have additional operations not included in the figure(s). Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A mobile device-implemented method comprising:
   receiving signals at a mobile device from one or more access points;
   computing one or more positioning quality parameters by analyzing the received signals, the one or more positioning quality parameters being indicative of respective error levels corresponding to respective one or more estimated positions of the mobile device;
   determining based, at least in part, on the computed one or more positioning quality parameters whether the mobile device is located inside or outside at least one of one or more pre-defined geographic areas respectively associated with the one or more access points, wherein determining whether the mobile device is located inside or outside the at least one of the one or more pre-defined geographic areas respectively associated with the one or more access points comprises determining whether the mobile device is located inside or outside the at least one of the one or more pre-defined geographic areas based on a determination of whether the computed one or more positioning quality parameters, indicative of the respective error levels corresponding to the respective one or more estimated positions of the mobile device, exceed one or more pre-determined error thresholds; and
   switching an operating mode of a positioning engine between a single-fix mode and a tracking mode based on determination of whether the mobile device is located inside or outside the at least one of the one or more pre-defined geographic areas, wherein switching the operating mode further comprises disabling transitions between the single-fix mode and the tracking mode based on:
      one or more values for at least one historical positioning quality parameter for one or more previous fixes,
      a determination of whether a difference between a first horizontal estimated position error (HEPE) value for a first time instance, preceding a current time, and a second HEPE value for a second time instance preceding the first time instance, is less than a pre-determined transitioning threshold,
      or both.

2. The method of claim 1, wherein the one or more access points are associated with one or more location context identifiers (LCIs), and wherein determining based, at least in part, on the computed one or more positioning quality parameters whether the mobile device is located inside or outside the at least one of the one or more pre-defined geographic areas respectively associated with the one or more access points comprises:

determining based, at least in part, on the computed one or more positioning quality parameters whether the mobile device is located inside or outside the at least one of the one or more pre-defined geographic areas respectively associated with the one or more LCIs.

3. The method of claim 1, wherein computing the one or more positioning quality parameters comprises:

computing a current HEPE value associated with the received signals.

4. The method of claim 1, wherein computing the one or more positioning quality parameters comprises:

computing a variance between actual round trip times (RTTs) or ranges associated with the received signals and expected RTTs or ranges associated with the received signals.

5. The method of claim 1, wherein switching the operating mode of the positioning engine comprises:

operating the positioning engine in the single-fix mode when the mobile device is determined to be outside the at least one of the one or more pre-defined geographic areas respectively associated with the one or more access points.

6. The method of claim 5, wherein operating the positioning engine in the single-fix mode comprises:

determining a likely location of the mobile device based on a subset of available feasible nodes used to determine the likely location of the mobile device.

7. The method of claim 1, further comprising:

displaying a position fix, determined based on the received signals from the one or more access points, at the mobile device.

8. The method of claim 7, wherein computing the one or more positioning quality parameters comprises computing a current HEPE value associated with the received signals, and wherein the method further comprises:

suspending display of the position fix when position of the mobile device is determined to be outside the at least one of the one or more pre-defined geographic areas respectively associated with the one or more access points and the computed current HEPE value is above a HEPE-Display threshold.

9. The method of claim 1, wherein determining based, at least in part, on the computed one or more positioning quality parameters whether the mobile device is located inside or outside the at least one of the one or more pre-defined geographic areas respectively associated with the one or more access points comprises:

defining a first bounding area using boundaries of the one or more areas respectively associated with the one or more access points, the first bounding associated with a first access point;

defining a second bounding area that extends from the first bounding area by a predetermined distance, the second bounding area encompassing the first bounding area;

determining whether the mobile device is positioned within the first bounding area; and when the mobile device is positioned outside the first bounding area, determining whether the mobile device is positioned within the second bounding area.

10. The method of claim 1, wherein computing the one or more positioning quality parameters comprises:

computing at least one received signal strength indication (RSSI) for at least one of the received signals;

and wherein determining based, at least in part, on the computed one or more positioning quality parameters whether the mobile device is located inside or outside the at least one of one or more pre-defined geographic areas respectively associated with the one or more access points comprises comparing the computed at least one RSSI to a pre-determined RSSI threshold.

11. The method of claim 1, further comprising:

displaying on the mobile device a first map of a first area in response to a determination that the mobile device is inside the first area; and displaying a second map of a second area on the mobile device in response to a determination that the mobile device moved outside the first area and inside the second area.

12. An apparatus comprising:

at least one processor; and a memory, coupled to the at least one processor, the memory comprising software code for implementing:

a positioning receiver coupled to a mobile device and configured to receive signals from one or more access points;

a signal analysis module configured to compute one or more positioning quality parameters by analyzing the received signals, the one or more positioning quality parameters being indicative of respective error levels corresponding to respective one or more estimated positions of the mobile device;

a detector configured to determine based, at least in part, on the computed one or more positioning quality parameters whether the mobile device is located inside or outside at least one of one or more pre-defined geographic areas respectively associated with the one or more access points, wherein the detector configured to determine whether the mobile device is located inside or outside the at least one of the one or more pre-defined geographic areas respectively associated with the one or more access points is configured to determine whether the mobile device is located inside or outside the at least one of the one or more pre-defined geographic areas based on a determination of whether the computed one or more positioning quality parameters, indicative of the respective error levels corresponding to the respective one or more estimated positions of the mobile device, exceed one or more pre-determined error thresholds; and a controller to switch an operating mode of a positioning engine between a single-fix mode and a tracking mode based on determination of whether the mobile device is located inside or outside the at least one of the one or more pre-defined geographic areas, wherein the controller configured to switch the operating mode is configured to disable transitions between the single-fix mode and the tracking mode based on:

one or more values for at least one historical positioning quality parameter for one or more previous fixes, a determination of whether a difference between a first horizontal estimated position error (HEPE) value for a first time instance, preceding a current time, and a second HEPE value for a second time instance preceding the first time instance, is less than a pre-determined transitioning threshold, or both.

13. The apparatus of claim 12, wherein the one or more access points are associated with one or more location context identifiers (LCIs), and wherein the detector configured to determine based, at least in part, on the computed one or more positioning quality parameters whether the mobile device is located inside or outside the at least one of the one or more pre-defined geographic areas respectively associated with the one or more access points is configured to:
   determine based, at least in part, on the computed one or more positioning quality parameters whether the mobile device is located inside or outside the at least one of the one or more pre-defined geographic areas respectively associated with the one or more LCIs.

14. The apparatus of claim 12, wherein the signal analysis module configured to compute the one or more positioning quality parameters is configured to:
   compute a current HEPE value associated with the received signals.

15. The apparatus of claim 12, wherein the signal analysis module configured to compute the one or more positioning quality parameters is configured to:
   compute a variance between actual round trip times (RTTs) or ranges associated with the received signals and expected RTTs or ranges associated with the received signals.

16. The apparatus of claim 12, wherein the controller to switch the operating mode of the positioning engine is configured to:
   operate the positioning engine in the single-fix mode when the mobile device is determined to be outside the at least one of the one or more pre-defined geographic areas respectively associated with the one or more access points.

17. The apparatus of claim 16, wherein the controller configured to operate the positioning engine in the single-fix mode is configured to:
   determine a likely location of the mobile device based on a subset of available feasible nodes used to determine the likely location of the mobile device.

18. The apparatus of claim 12, further comprising:
   a display device, at the mobile device, configured to display a position fix, determined based on the received signals from the one or more access points.

19. The apparatus of claim 18, wherein the signal analysis module configured to compute the one or more positioning quality parameters is configured to compute current HEPE value associated with the received signals, and wherein the display device is further configured to:
   suspend display of the position fix when position of the mobile device is determined to be outside the at least one of the one or more pre-defined geographic areas respectively associated with the one or more access points, and the computed current HEPE value is above a HEPE-Display threshold.

20. The apparatus of claim 12, wherein the detector configured to determine based, at least in part, on the computed one or more positioning quality parameters whether the mobile device is located inside or outside the at least one of the one or more pre-defined geographic areas respectively associated with the one or more access points is configured to:
   define a first bounding area using boundaries of the one or more pre-defined geographic areas respectively associated with the one or more access points;
   define a second bounding area that extends from the first bounding area by a predetermined distance;
   determine whether the mobile device is positioned within the first bounding area; and
   when the mobile device is positioned outside the first bounding area, determine whether the mobile device is positioned within the second bounding area.

21. The apparatus of claim 12, wherein the signal analysis module configured to compute the one or more positioning quality parameters is configured to:
   compute at least one received signal strength indication (RSSI) for at least one of the received signals;
   and wherein the detector configured to determine based, at least in part, on the computed one or more positioning quality parameters whether the mobile device is located inside or outside the at least one of the one or more pre-defined geographic areas respectively associated with the one or more access points is configured to compare the computed at least one RSSI to a pre-determined RSSI threshold.

22. The apparatus of claim 12, further comprising:
   a display device configured to:
   display on the mobile device a first map of a first area in response to a determination that the mobile device is inside the first area; and
   display a second map of a second area on the mobile device in response to a determination that the mobile device moved outside the first area and inside the second area.

23. A system comprising:
   means for receiving signals at a mobile device from one or more access points;
   means for determining based, at least in part, on computed one or more positioning quality parameters whether the mobile device is located inside or outside at least one of one or more pre-defined geographic areas respectively associated with the one or more access points, wherein the one or more positioning quality parameters are indicative of respective error levels corresponding to respective one or more estimated positions of the mobile device, wherein the means for determining whether the mobile device is located inside or outside the at least one of the one or more pre-defined geographic areas respectively associated with the one or more access points is configured to determine whether the mobile device is located inside or outside the at least one of the one or more pre-defined geographic areas based on a determination of whether the computed one or more positioning quality parameters, indicative of the respective error levels corresponding to the respective one or more estimated positions of the mobile device, exceed one or more pre-determined error thresholds; and
   means for switching an operating mode of a positioning engine between a single-fix mode and a tracking mode based on determination of whether the mobile device is located inside or outside the at least one of the one or more pre-defined geographic areas, wherein the means for switching the operating mode comprises means for disabling transitions between the single-fix mode and the tracking mode based on:
   one or more values for at least one historical positioning quality parameter for one or more previous fixes,
   a determination of whether a difference between a first horizontal estimated position error (HEPE) value for a first time instance, preceding a current time, and a second HEPE value for a second time instance preceding the first time instance, is less than a pre-determined transitioning threshold,
   or both.

24. The system of claim 23, wherein the one or more access points are associated with one or more location context identifiers (LCIs), and wherein the means for determining based, at least in part, on the computed one or more positioning quality parameters whether the mobile device is located inside or outside the at least one of the one or more pre-defined geographic areas respectively associated with the one or more access points comprises:
  means for determining based, at least in part, on the computed one or more positioning quality parameters whether the mobile device is located inside or outside the at least one of the one or more pre-defined geographic areas respectively associated with the one or more LCIs.

25. The system of claim 23, wherein the one or more positioning quality parameters
  comprise a current HEPE value associated with the received signals.

26. The system of claim 23, wherein the one or more positioning quality parameters comprise a variance between actual round trip times (RTTs) or ranges associated with the received signals and expected RTTs or ranges associated with the received signals.

27. The system of claim 23, wherein the means for switching the operating mode of the positioning engine comprises:
  means for operating the positioning engine in the single-fix mode when the mobile device is determined to be outside the at least one of the one or more pre-defined geographic areas respectively associated with the one or more access points.

28. The system of claim 27, wherein the means for operating the positioning engine in the single-fix mode comprises:
  means for determining a likely location of the mobile device based on a subset of available feasible nodes used to determine the likely location of the mobile device.

29. The system of claim 23, further comprising:
  means for displaying a position fix, determined based on the received signals from the one or more access points, at the mobile device.

30. The system of claim 29, wherein the one or more positioning quality parameters comprise current HEPE value associated with the received signals, and wherein the system further comprises:
  means for suspending display of the position fix when position of the mobile device is determined to be outside the at least one of the one or more pre-defined geographic areas respectively associated with the one or more access points and the computed current HEPE value is above a HEPE-Display threshold.

31. The system of claim 23, wherein the means for determining based, at least in part, on the computed one or more positioning quality parameters whether the mobile device is located inside or outside the at least one of the one or more pre-defined geographic areas respectively associated with the one or more access points comprises is configured to:
  define a first bounding area using boundaries of the one or more pre-defined geographic areas respectively associated with the one or more access points;
  define a second bounding area that extends from the first bounding area by a predetermined distance;
  determine whether the mobile device is positioned within the first bounding area; and
  determine whether the mobile device is positioned within the second bounding area when the mobile device is positioned outside the first bounding area.

32. The system of claim 23, wherein the one or more positioning quality parameters
  comprise at least one received signal strength indication (RSSI) for at least one of the received signals;

and wherein the means for determining based, at least in part, on the computed one or more positioning quality parameters whether the mobile device is located inside or outside the at least one of one or more pre-defined geographic areas respectively associated with the one or more access points is configured to compare the computed at least one RSSI to a pre-determined RSSI threshold.

33. The system of claim 23, further comprising:
  means for displaying on the mobile device a first map of a first area in response to a determination that the mobile device is inside the first area; and
  means for displaying a second map of a second area on the mobile device in response to a determination that the mobile device moved outside the first area and inside the second area.

34. A non-transitory processor readable media programmed with a set of instructions executable on a processor that, when executed, causes operations comprising:
  receiving signals at a mobile device from one or more access points;
  computing one or more positioning quality parameters by analyzing the received signals, the one or more positioning quality parameters being indicative of respective error levels corresponding to respective one or more estimated positions of the mobile device;
  determining based, at least in part, on the computed one or more positioning quality parameters whether the mobile device is located inside or outside at least one of one or more pre-defined geographic areas respectively associated with the one or more access points, wherein determining whether the mobile device is located inside or outside the at least one of the one or more pre-defined geographic areas respectively associated with the one or more access points comprises determining whether the mobile device is located inside or outside the at least one of the one or more pre-defined geographic areas based on a determination of whether the computed one or more positioning quality parameters, indicative of the respective error levels corresponding to the respective one or more estimated positions of the mobile device, exceed one or more pre-determined error thresholds; and
  switching an operating mode of a positioning engine between a single-fix mode and a tracking mode based on determination of whether the mobile device is located inside or outside the at least one of the one or more pre-defined geographic areas, wherein switching the operating mode comprises disabling transitions between the single-fix mode and the tracking mode based on:
    one or more values for at least one historical positioning quality parameter for one or more previous fixes,
    a determination of whether a difference between a first horizontal estimated position error (HEPE) value for a first time instance, preceding a current time, and a second HEPE value for a second time instance preceding the first time instance, is less than a pre-determined transitioning threshold,
    or both.

35. The processor readable media of claim 34, wherein the one or more access points are associated with one or more location context identifiers (LCIs), and wherein determining based, at least in part, on the computed one or more positioning quality parameters whether the mobile device is located inside or outside the at least one of the one or more pre-defined geographic areas respectively associated with the one or more access points comprises:

determining based, at least in part, on the computed one or more positioning quality parameters whether the mobile device is located inside or outside the at least one of the one or more pre-defined geographic areas respectively associated with the one or more LCIs.

36. The processor readable media of claim 34, wherein computing the one or more positioning quality parameters comprises:
computing a current HEPE value associated with the received signals.

37. The processor readable media of claim 34, wherein computing the one or more positioning quality parameters comprises:
computing a variance between actual round trip times (RTTs) or ranges associated with the received signals and expected RTTs or ranges associated with the received signals.

38. The processor readable media of claim 34, wherein switching the operating mode of the positioning engine comprises:
operating the positioning engine in the single-fix mode when the mobile device is determined to be outside the at least one of the one or more pre-defined geographic areas respectively associated with the one or more access points.

39. The processor readable media of claim 38, wherein operating the positioning engine in the single-fix mode comprises:
determining a likely location of the mobile device based on a subset of available feasible nodes used to determine the likely location of the mobile device.

40. The processor readable media of claim 34, wherein the set of instructions causes further operations comprising:
displaying a position fix, determined based on the received signals from the one or more access points, at the mobile device.

41. The processor readable media of claim 40, wherein computing the one or more positioning quality parameters comprises computing a current HEPE value associated with the received signals, and wherein the method further comprises:
suspending display of the position fix when position of the mobile device is determined to be outside the at least one of the one or more pre-defined geographic areas respectively associated with the one or more access points and the computed current HEPE value is above a HEPE-Display threshold.

42. The processor readable media of claim 34, wherein determining based, at least in part, on the computed one or more positioning quality parameters whether the mobile device is located inside or outside the at least one of the one or more pre-defined geographic areas respectively associated with the one or more access points comprises:
defining a first bounding area using boundaries of the one or more pre-defined geographic areas respectively associated with the one or more access points;
defining a second bounding area that extends from the first bounding area by a predetermined distance;
determining whether the mobile device is positioned within the first bounding area; and
when the mobile device is positioned outside the first bounding area, determining whether the mobile device is positioned within the second bounding area.

43. The processor readable media of claim 34, wherein computing the one or more positioning quality parameters comprises:
computing at least one received signal strength indication (RSSI) for at least one of the received signals;
and wherein determining based, at least in part, on the computed one or more positioning quality parameters whether the mobile device is located inside or outside the at least one of one or more pre-defined geographic areas respectively associated with the one or more access points comprises comparing the computed at least one RSSI to a pre-determined RSSI threshold.

44. The processor readable media of claim 34, wherein the set of instructions causes further operations comprising:
displaying on the mobile device a first map of a first area in response to a determination that the mobile device is inside the first area; and
displaying a second map of a second area on the mobile device in response to a determination that the mobile device moved outside the first area and inside the second area.

* * * * *